United States Patent [19]
Krein et al.

[11] Patent Number: 5,473,762
[45] Date of Patent: Dec. 5, 1995

[54] METHOD AND SYSTEM FOR PIPELINING BUS REQUESTS

[75] Inventors: William T. Krein, San Jose; Charles M. Flaig, Cupertino; James D. Kelly, Aptos, all of Calif.

[73] Assignee: Apple Computer Inc., Cupertino, Calif.

[21] Appl. No.: 186,381

[22] Filed: Jan. 25, 1994

[51] Int. Cl.$^6$ .................................................. G06F 13/00
[52] U.S. Cl. ......................... 395/287; 395/293; 395/298; 395/728; 395/729
[58] Field of Search ................................... 395/325, 726, 395/298

[56] References Cited

U.S. PATENT DOCUMENTS

| | | |
|---|---|---|
| 5,255,376 | 10/1993 | Frank . |
| 5,280,623 | 1/1994 | Sodos et al. ............................ 395/325 |
| 5,289,583 | 2/1994 | Fischer et al. ......................... 395/325 |

FOREIGN PATENT DOCUMENTS 90313905  12/1990  European Pat. Off. .

OTHER PUBLICATIONS

Bergey, A. L. Jr. and Coale, J. L., "Method for Decreasing Arbitration Overhead", IBM Technical Disclosure Bulletin, vol. 26, No. 7A, Dec. 1983, pp. 3370–3371.
Blum, A., "Look-Ahead Access Request Circuit for Computer Systems", IBM Technical Disclosure Bulletin, vol. 22, No. 3, Aug. 1979, pp. 1059–1060.
"Processor Bus Arbitration With Dead Cycles," IBM Technical Disclosure Bulletin, vol. 32, No. 8A, Jan. 1990, p. 451.

*Primary Examiner*—Jack B. Harvey
*Assistant Examiner*—John Travis
*Attorney, Agent, or Firm*—Phong K. Truong

[57] ABSTRACT

A system for pipelining bus requests includes a bus, at least one node coupled to the bus, and a bus coordinator coupled to the node. The node uses a single bus request signal to both request control of the bus from the bus coordinator, and to retain control of the bus. In response to an asserted bus request signal from the node, the coordinator sends an asserted bus grant signal to the node to grant the node control of the bus. This bus grant signal tracks the bus request signal so that as long as the bus request signal remains asserted, the bus grant signal also is asserted. To allow for pipelining, the bus coordinator maintains the bus grant signal in an asserted state for at least one clock cycle after the bus request is deasserted. By holding the bus grant signal in the asserted state for one extra cycle, the coordinator gives the node time to deassert and then to reassert the bus request signal before the bus grant signal changes state. If the bus request is reasserted within the extra cycle, the coordinator continues to maintain the bus grant signal in the asserted state so that no state change is experienced by the bus grant signal between the deassertion and the reassertion of the bus request signal. In this manner, consecutive bus requests are pipelined. To further increase the efficiency of the system, the node deasserts the bus request signal at least one clock cycle before it send its last set of information, and continues to send information signals in the following clock cycle. By so doing, the node ensures that the extra clock cycle of the bus grant is not wasted.

8 Claims, 5 Drawing Sheets

METHOD AND SYSTEM FOR PIPELINING BUS REQUESTS

FIELD OF THE INVENTION

This invention relates generally to computer systems and more specifically to a method and system for pipelining bus requests which increases bus utilization and improves system performance.

DESCRIPTION OF THE BACKGROUND ART

A typical computer system comprises a motherboard, a system bus, and a plurality of "nodes" or devices coupled to the system bus. The system bus is used by the nodes to send information signals to the motherboard and to each other. Because a plurality of different nodes are coupled to the same bus, some bus coordination mechanism is needed in order to coordinate access to the bus by the nodes to prevent bus contention. This bus coordination function is usually performed by a bus arbiter. A bus arbiter controls access to the system bus by first receiving bus access requests from the various nodes, and then determining (usually by performing some arbitration algorithm) which node should gain control of the system bus. Thereafter, the arbiter sends a bus grant control signal to the selected node to grant control of the bus to that node. Once the selected node has control of the bus, it is free to use the bus to send information signals. When information transmission is complete, the node notifies the arbiter that it no longer needs the bus and, at that point, the arbiter deasserts the bus grant signal to take control of the bus away from the node.

In typical operation, the bus arbiter alternatingly grants the system bus to a number of different nodes. There are times, however, when only one node actively and repeatedly requests the bus. During these times, it would be desirable for the requesting node to "pipeline" its requests. Pipelining is a process by which a node chains together consecutive bus requests such that the bus grant signal from the arbiter to the requesting node does not change logic levels between the different bus requests. Pipelining is desirable because it eliminates dead-time on the bus between consecutive information transfers, which in turn, increases bus utilization and improves system performance.

Currently, pipelining is implemented by having the requesting node generate and manage two separate signals. A first signal is used to request the bus, and a second signal is used to indicate to the arbiter that the node is finished with the bus. Such a pipelining scheme, while functional, is cumbersome because it requires that the node and arbiter manage and process two separate signals. Ideally, pipelining should be implemented using only one signal from the node, with this one signal being used to both request the bus and to retain ownership of the bus. Currently, however, there is no bus system believed to be available which has the ability to pipeline bus requests using only one signal from the requesting node.

SUMMARY OF THE INVENTION

In accordance with the present invention, there is provided a system wherein pipelining is implemented using only one bus request signal from the requesting node. The system of the present invention preferably comprises a bus, at least one node coupled to the bus, and a bus coordinator coupled to the node for coordinating access to the bus by the node. To access the bus, the node sends an asserted bus request signal to the coordinator. This bus request signal is used by the node to both request control of the bus and to retain ownership of the bus. In response, the coordinator sends an asserted bus grant signal to the node to grant control of the bus to the node. This bus grant signal preferably remains asserted as long as the bus request from the node is asserted. Once the node is granted control of the bus, it transmits information signals onto the bus. After sending the asserted bus grant signal to the node, the coordinator monitors the status of the bus request signal to determine whether the node wishes to retain ownership of the bus. If the bus request signal is deasserted by the node, then it is determined that the node no longer needs the bus, thus, the bus grant signal can be deasserted to take control of the bus away from the node.

In the present invention, pipelining is provided for by maintaining the bus grant signal in an asserted state for at least one clock cycle after deassertion of the bus request signal is detected. That is, whenever, the coordinator detects that the bus request signal has been deasserted, it does not immediately deassert the bus grant signal but instead maintains the bus grant signal in an asserted state for at least one extra clock cycle. In effect, the coordinator is granting control of the bus to the node for an extra clock cycle. This extra cycle gives the node sufficient time to deassert and to reassert the bus request signal before the bus grant signal changes states. Where the bus grant signal is reasserted by the node before the extra clock cycle elapses, the coordinator does not deassert the bus grant signal but instead maintains the bus grant signal in the asserted state to allow the node to send another set of information signals onto the bus. Because the bus grant signal does not change states between the deassertion and reassertion of the bus request signal, there is no "dead time" between the two bus requests. Thus, the two requests are pipelined.

To further improve system efficiency, the present invention prevents the extra bus grant cycle from being wasted by having the node deassert the bus request signal one clock cycle before transmitting its last set of information signals. Since the bus is granted to the node for one extra clock cycle, the node may use this extra clock cycle to transmit the last of its information signals. By so doing, the extra bus grant cycle is not wasted when pipelining is not performed.

DETAILED DESCRIPTION OF THE PREFERRED EMBODIMENTS

Figure 1:
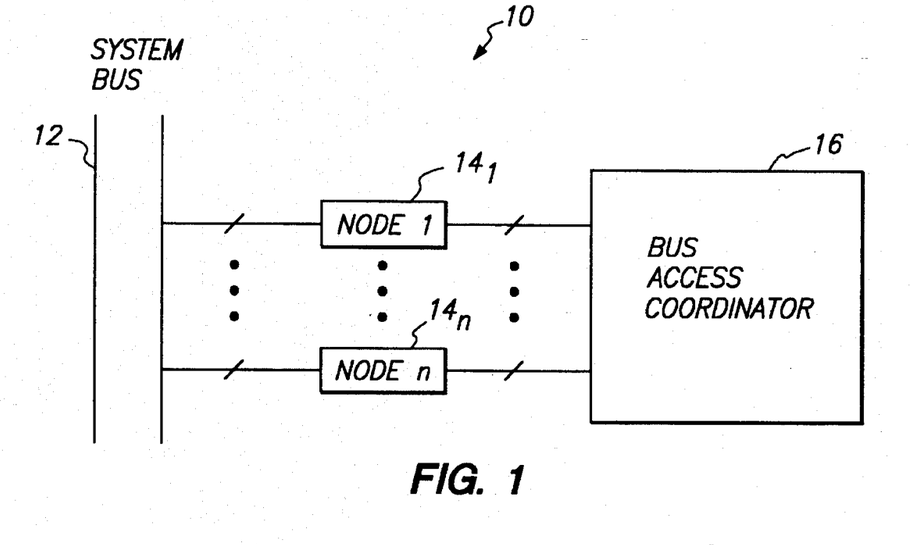
FIG. 1 is a general block diagram of the system of the present invention.

With reference to FIG. 1, there is shown a general block diagram of the system 10 of the present invention, wherein the system 10 preferably comprises a system bus 12, a plurality of nodes $14_1$-$14_n$ coupled to and sharing the bus 12, and a bus access coordinator 16 coupled to the nodes 14₁-14ₙ. Each of the nodes 14 may represent a device which generates and sends information signals, or a port through which information signals may be sent. Because a plurality of nodes 14 are coupled to the same bus 12, a mechanism is needed for coordinating access to the bus by the nodes 14 in order to prevent bus contention. Coordinator 16 serves this purpose.

To gain access to the bus 12, a node 14 first sends an asserted bus request signal to coordinator 16 to request permission to control the bus 12. If multiple bus request signals are simultaneously received by coordinator 16, as will often be the case, the coordinator 16 carries out an arbitration scheme to determine which node should be granted control of the bus 12. The arbitration scheme may be a round-robin type of fairness scheme or some other type of scheme. After it is determined which node 14 should get control of the bus 12, coordinator 16 sends an asserted bus grant signal to the selected node (node 1 14$_I$, for example) to grant control of the bus 12 to that node. After gaining control of the bus 12, the selected node 14$_I$ may send information signals onto the bus.

After granting control of the bus 12 to a selected node 14$_I$, the coordinator 16 monitors the bus request signal from that node 14$_I$ to determine whether the signal is still asserted. If the bus request signal remains asserted, then it means that the node 14$_I$ is still using the bus; thus, coordinator 16 maintains the bus grant signal in the asserted state. However, if the bus request signal becomes deasserted, then coordinator can conclude that node 14$_I$ no longer needs the bus; thus, coordinator 16 can deassert the bus grant signal to take control of the bus 12 away from the selected node 14$_I$. Because the bus grant signal tracks the bus request signal, the bus request signal is used by a node 14 not only to request access to the bus 12 but also to retain ownership of the bus 12. Using the same signal for both purposes simplifies the design of system 10.

In regular operation, the bus access coordinator 16 probably receives and processes a multiplicity of bus requests at a time so that it alternatingly grants the system bus 12 to a number of different nodes. There are times, however, when coordinator 16 repeatedly grants control of the bus 12 to the same node. This may be due to the fact that only one node is actively and repeatedly requesting the bus, or it may be due to priority considerations, time slice considerations, or priority/time slice considerations. Whatever the reason, it would be desirable during such times for coordinator 16 to pipeline the bus requests from the node to minimize "dead time" on the bus 10, thereby maximizing bus utilization.

In the system of the present invention, pipelining is provided for by having coordinator 16 maintain the bus grant signal in the asserted state for at least one extra clock cycle after deassertion of the bus request signal is detected. As discussed above, the bus grant signal tracks the bus request signal. As long as the bus request signal remains asserted, the bus grant signal also remains asserted. But as soon as deassertion of the bus request signal is detected, the coordinator is free to deassert the bus grant signal to wrest control of the bus 12 away from the node. In the present invention, instead of deasserting the bus grant signal as soon as deassertion of the bus request signal is detected, the coordinator 16 preferably maintains the bus grant signal in the asserted state for an extra clock cycle after deassertion of the bus request signal is detected. This extra clock cycle gives the node time to reassert the bus request signal (thus, making another bus request) before the bus grant signal changes states. If the bus request signal is reasserted before the extra clock cycle expires (and if the bus is once again granted to the node), then the node gains another tenure on the bus 12 without having the bus grant signal change states. Thus, ownership of the bus is continuous, which means that "dead time" on the bus is eliminated. Consecutive bus requests are thus pipelined.

Figure 2:
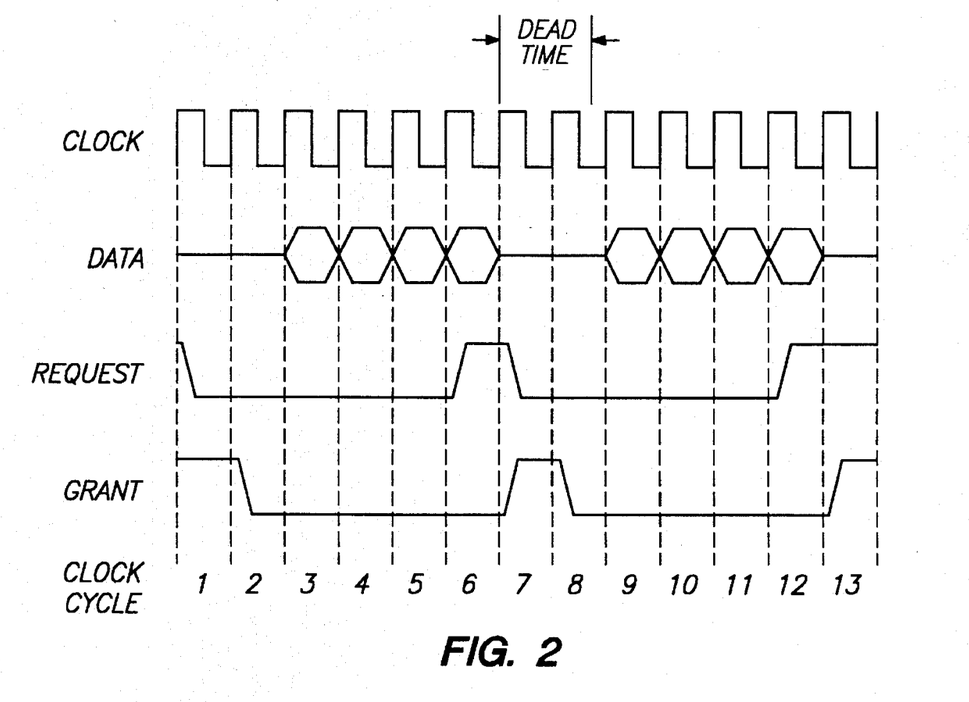
FIG. 2 is a timing diagram of a bus coordination system which does not implement pipelining.

To elaborate upon the concept of pipelining, reference is made to FIG. 2, wherein a timing diagram is provided of a bus coordination system which does not pipeline. In the system of FIG. 2, the requesting node asserts its bus request signal at the beginning of clock cycle 1 to request access to the bus. Assuming that the requesting node is granted the bus, the bus grant signal is asserted as soon as the asserted bus request signal is detected, namely, at the beginning of cycle 2. In cycles 3–6, the node has control of the bus; thus, during this time period, the node sends data onto the bus. As the last clock cycle of data is sent, the node deasserts its request signal to indicate that it is now finished using the bus. The coordinator detects the deassertion of the request signal at the beginning of cycle 7 and, in response, it deasserts the grant signal during cycle 7.

Suppose now that after deasserting the request signal in cycle 6, the node decides that it needs another tenure on the bus. To request another bus tenure, the node reasserts the request signal at the beginning of cycle 7. This reassertion of the request signal, however, is not detected by the coordinator in cycle 7 but in cycle 8. This means that the coordinator will deassert the grant signal in cycle 7 and then reassert the grant signal in cycle 8 so that the grant signal changes states. The consequence of having the grant signal change states is that "dead time" is imposed on the bus as shown in FIG. 2. During this "dead time", no node has control of the bus and no information transfer is conducted on the bus. Thus, valuable bus time is wasted.

Pipelining consecutive bus requests eliminates the dead time between bus requests. To elaborate upon this point, reference is made to FIG. 3, wherein a timing diagram for the system of the present invention is provided. In accordance with the present invention, a requesting node (node 1 14$_I$, for example) asserts its bus request signal at the beginning of clock cycle 1 to request control of the bus. This request signal is detected by coordinator 16 in cycle 2 and, assuming that the bus 12 is granted to node 1, the bus grant signal is asserted in cycle 2. During cycles 3–6, node 1 has control of the bus 12; thus, during this time period, data may be transmitted from node 1 onto bus 12. At the beginning of cycle 6, node 1 deasserts the request signal to indicate that it no longer needs the bus. The deassertion of the request signal is detected by coordinator 16 at the beginning of cycle 7 and, typically, the grant signal would be deasserted in cycle 7. However, the coordinator 16 of the present invention maintains the grant signal in the asserted state for one extra clock cycle. Thus, the grant signal, if deasserted at all, will not be deasserted until cycle 8.

Figure 3:
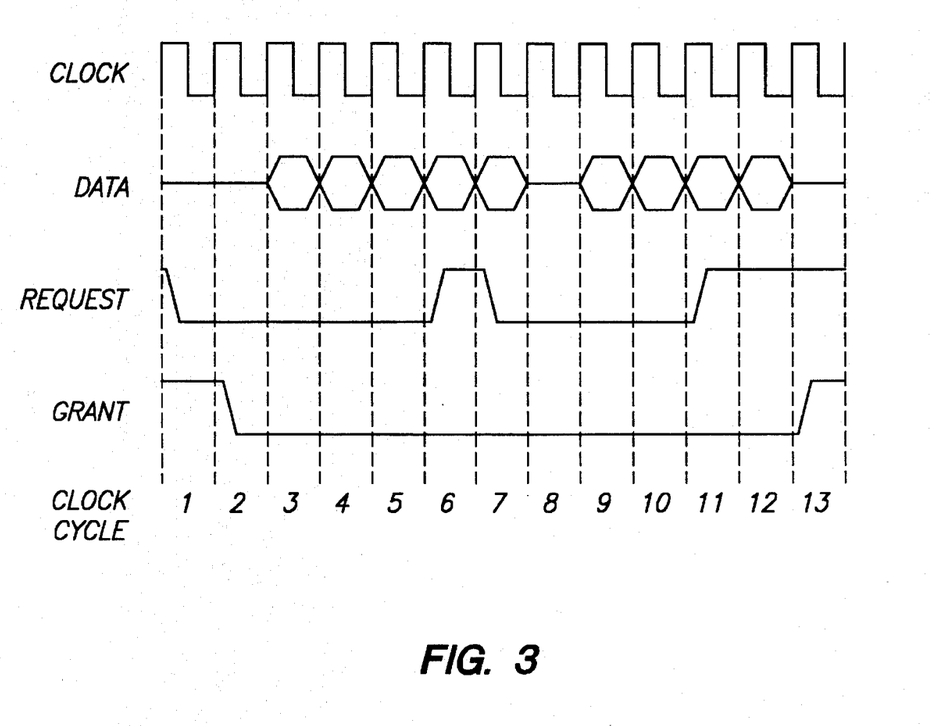
FIG. 3 is a timing diagram of the bus coordination system of the present invention illustrating the process of pipelining consecutive bus requests.

Suppose now that after deasserting the request signal in cycle 6, node 1 decides that it needs another bus tenure. To request another tenure on the bus 12, node 1 reasserts the request signal in cycle 7. This reassertion of the request signal is detected by coordinator 16 at the beginning of cycle 8. Recall that because the request signal was deasserted in cycle 6, the bus grant signal was due to be deasserted in cycle 8. However, by the beginning of cycle 8, the request signal has already been reasserted, which indicates to coordinator 16 that another bus tenure is desired. When the coordinator 16 detects in cycle 8 that the request signal has been reasserted, the coordinator 16 does not deassert and reassert the grant signal, but instead simply maintains the grant signal in the asserted state to grant node 1 another bus tenure. Hence, between the first and second bus requests, the bus grant signal does not change states. Since the bus grant signal does not change states, no "dead time" is imposed on the bus 12. Consecutive bus requests from a single node are thus pipelined.

While pipelining consecutive bus requests improves bus utilization efficiency, adding an extra bus grant cycle to every bus grant may offset any gain in efficiency unless that extra cycle is used productively. To put the extra grant cycle to good use, each requesting node in the system of the present invention preferably sends information signals onto the bus during the extra grant cycle. To clarify this point, notice that in FIG. 3, the request signal is deasserted at the beginning of cycle 6 but that data is sent onto the bus 12 through cycle 7. Likewise, the request signal is deasserted at the beginning of cycle 11 but data is transmitted onto bus 12 through cycle 12. Usually, a node sends its last clock cycle of information as it is deasserting its request signal. In the present invention, however, the node preferably deasserts its request signal and then one clock cycle later, transmit its last clock cycle of information as shown in FIG. 3. The requesting node can do this because it knows that the bus grant signal will remain asserted for an extra cycle after deassertion of the request signal is detected. By deasserting the request signal one clock cycle before it sends its last set of information, and by continuing to send information signals onto the bus 12 during the following cycle, the requesting node ensures that the extra grant cycle is not wasted. Thus, the system of the present invention provides the best of both worlds. It allows for pipelining by providing for an extra bus grant cycle while, at the same time, ensuring that the extra grant cycle is used productively.

In order to implement the method of the present invention, each node 14 preferably comprises a source interface for deasserting the bus request signal one clock cycle early, and the bus coordinator 16 preferably comprises at least one node interface for maintaining the bus grant signal to a node in the asserted state for one extra clock cycle. In the preferred embodiment, coordinator 16 preferably comprises a plurality of node interfaces, each node interface corresponding to one of the nodes 14. Preferably, these interfaces take the form of state machines, but it should be noted that these interfaces may also be implemented by other equivalent means such as software and the like. To aid in further describing these interfaces, a flow diagram for the source interface state machine of each node is provided in FIG. 4, and a flow diagram for the node interface state machine of the coordinator 16 is provided in FIG. 5.

Figure 4:
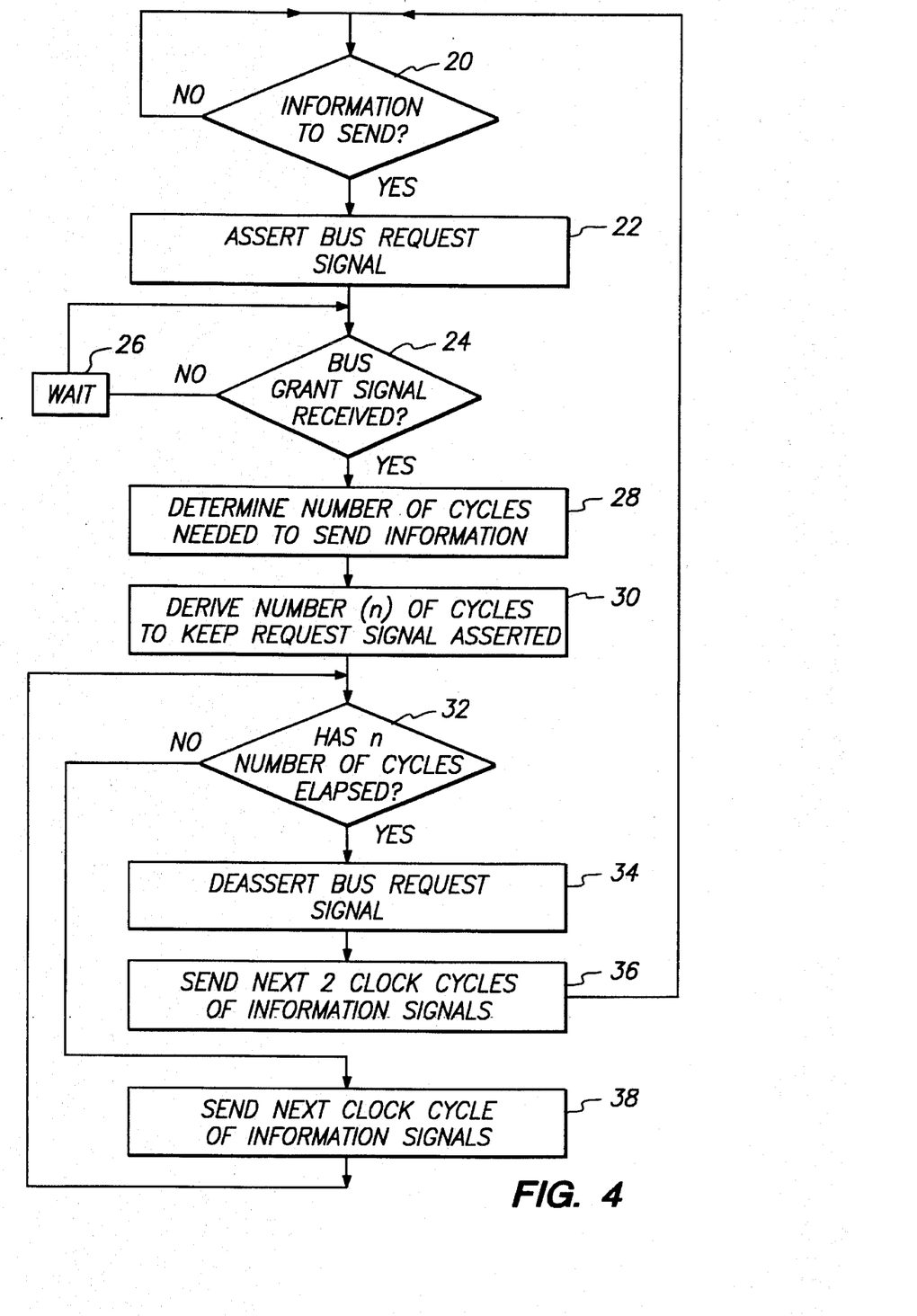
FIG. 4 is a flow diagram for the source interface state machine associated with each node.

With reference to FIG. 4, the source interface state machine begins operation by determining 20 whether the node has any information signals to send. If not, the source interface continuously cycles until the node has information signals to send. When the node has information signals to send onto the bus 12, the source interface asserts 22 the bus request signal and sends this signal to the coordinator 16 to request control of the bus 12. Thereafter, the source interface waits 24, 26 for a bus grant signal from coordinator 16. When the bus grant signal is received, the interface knows that it has control of the bus and that it can begin transmitting information signals onto the bus 12. The source interface begins the transmitting process by determining 28 how many clock cycles will be needed in order to transmit all of the information signals. Using the number derived in step 28, the source interface derives 30 the number (n) of clock cycles that the request signal should remain asserted after the bus grant signal is received. Preferably, the number n is equal to the number of cycles needed to transmit the information minus two so that the request signal is deasserted two clock cycles before transmission of the information is complete. To put it another way, the node preferably deasserts the request signal one clock cycle before it sends the last portion of its information signals. After deriving n, the source interface determines 32 whether an n number of clock cycles has elapsed. If not, the interface sends 38 the next clock cycle of information onto the bus 12 and loops back to step 32. If an n number of clock cycles has elapsed, then the source interface deasserts 34 the request signal and, thereafter, sends 36 the last two clock cycles of information onto the bus 12. The interface then loops back to step 20 for another set of information. By operating in the manner described above, the source interface causes information signals to be sent onto the bus 12 during the extra bus grant cycle. By so doing, the interface ensures that the extra grant cycle provided by the coordinator 16 will be used productively.

Figure 5:
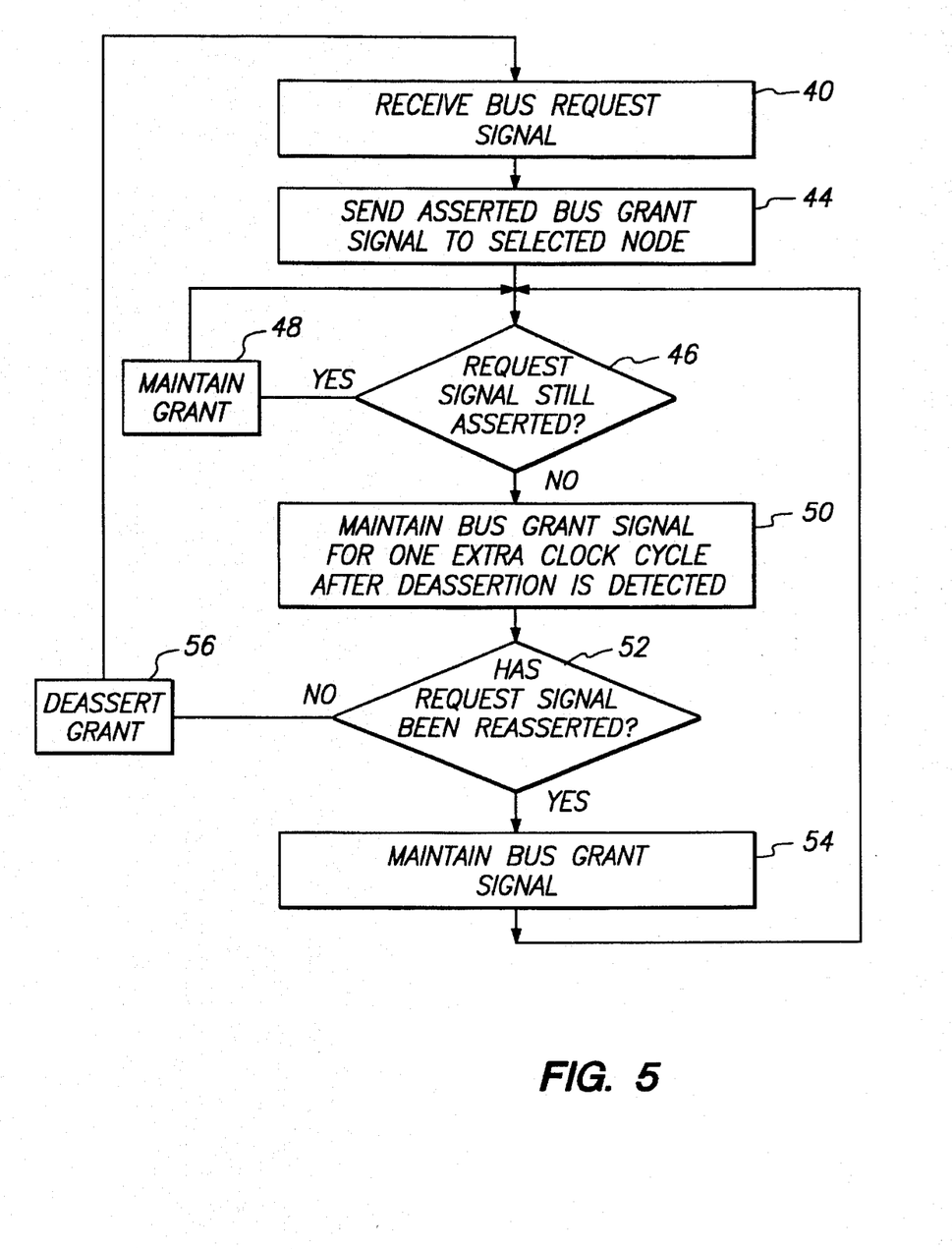
FIG. 5 is a flow diagram for the node interface state machine of the bus access coordinator.

With reference to FIG. 5, the node interface state machine of the coordinator 16 will now be described. The node interface begins operation by receiving 40 a bus request signal from the node to which it corresponds (node 1, for example). This bus request signal (along with the other bus request signals received from the other nodes by other node interfaces) is passed on to the coordinator 16. The coordinator 16 performs an arbitration procedure on the various request signals received and determines which node should receive control of the bus 12 next. If coordinator 16 determines that node 1 should be the next node to own the bus, then the node interface sends 44 an asserted bus grant signal to node 1 to grant control of the bus 12 to node 1. Once the bus grant signal is sent, the node interface monitors 46 the status of the request signal from node 1. If the request signal continues to be asserted, then the node interface maintains 48 the bus grant signal at the asserted state. But, if the node interface detects that the request signal has been deasserted, then it will maintain 50 the bus grant signal in the asserted state for one extra clock cycle. Thereafter, the node interface checks 52 again the status of the request signal to determine whether the request signal has been reasserted (and hence, node 1 is attempting to pipeline). If the request signal has not been reasserted, then the node interface deasserts 56 the bus grant signal to take control of the bus away from node 1. However, if the request signal has been reasserted and if coordinator 16 has again granted control of the bus to node 1, then the node interface maintains 54 the bus grant signal at the asserted level so that between the first and second bus requests, the bus grant signal does not change states. By maintaining the bus grant signal at the asserted state, the node interface allows the node (node 1) to pipeline consecutive requests.

Figure 6:
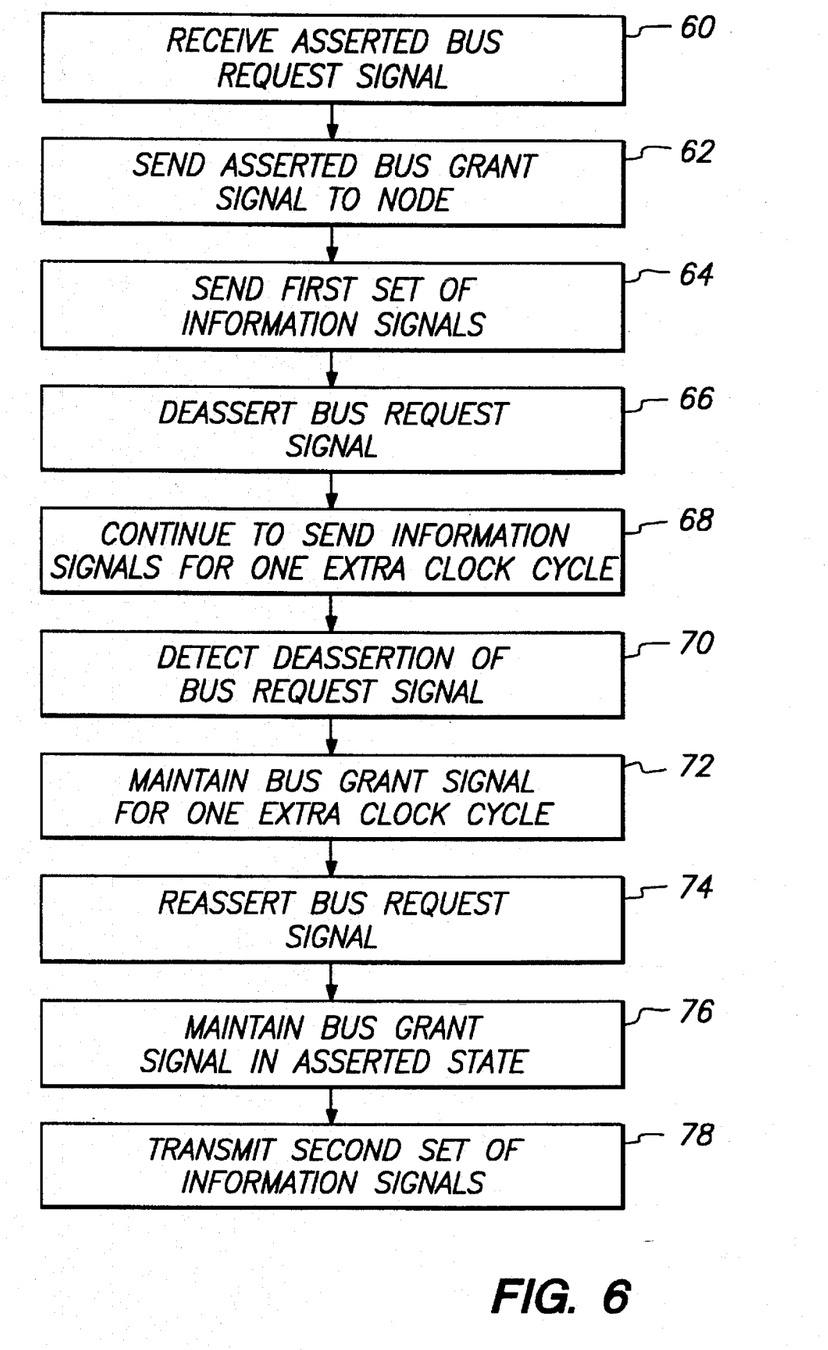
FIG. 6 is a flow diagram of the pipelining process as implemented by the system of the present invention.

With reference to the flow diagram provided in FIG. 6, the process of pipelining using the system of the present invention will now be described. For the purpose of illustration, it will be assumed that node 1 is the node which wishes to pipeline consecutive bus requests. The pipelining process begins with the node interface corresponding to node 1 receiving 60 an asserted bus request signal from node 1. In response, the node interface sends 62 an asserted bus grant signal to node 1 to grant node 1 control of the bus 12. Once it has ownership of the bus 12, node 1 begins sending 64 a first set of information signals onto the bus 12. One clock cycle before node 1 sends the last portion of its information signals, node 1 deasserts 66 the bus request signal but continues 68 to send two more clock cycles of information signals. The deassertion of the bus request signal is detected 70 by the node interface and, in response, the node interface maintains 72 the bus grant signal in the asserted state for one extra clock cycle after deassertion of the request signal is detected. While the bus grant signal is maintained by the node interface, node 1 reasserts 74 the bus request signal to request another tenure on the bus 12. If the request signal is reasserted before the extra bus grant cycle elapses, then the node interface maintains 76 the bus grant signal in the asserted state to grant node 1 another tenure on the bus 12. The bus grant signal does not experience a state change between the two bus tenures. The two bus requests from node 1 are thus pipelined. After being granted the second bus tenure, node 1 proceeds to transmit 78 another set of information signals onto the bus 12. The process described above may be repeated to pipeline any number of consecutive bus requests.

As the invention has thus far been described, the node interface of the coordinator 16 maintains the bus grant signal in the asserted state for one extra clock cycle and the source interface deasserts the bus request signal one clock cycle early. It should be noted, however, that the present invention may be implemented by having the node interface maintain the bus grant signal for two extra clock cycles and by having the source interface deassert the request signal two clock cycles early. In fact, the invention may be implemented using any desired number of clock cycles. This and other modifications are within the scope of the present invention.

What is claimed is:

1. A method for coordinating access to a bus, comprising the steps of:

receiving an asserted bus request signal from a node;

in response to said bus request signal, sending an asserted bus grant signal to said node to grant control of said bus to said node for a first tenure;

monitoring said bus request signal for any change in state;

maintaining said grant signal in the asserted state as long as said bus request signal is asserted;

in response to a deassertion of said bus request signal;
      maintaining said bus grant signal in the asserted state for at least one extra clock cycle after deassertion of said bus request signal is detected;
      initiating an arbitration procedure to determine whether control of said bus is to be granted again to said node; and in response to a determination that control of said bus is to be granted again to said node, maintaining said bus grant signal in the asserted state to grant control of said bus to said node for a second tenure, said grant signal experiencing no change in state between said first and second tenures.

2. The method of claim 1, further comprising the step of:
   in response to a determination that control of said bus is not to be granted again to said node, deasserting said bus grant signal.

3. In a system comprising a bus, a node coupled to said bus, and a bus coordinator coupled to said node for controlling access to said bus by said node, a method for transmitting information signals from said node onto said bus, comprising the steps of:

sending an asserted bus request signal from said node to said bus coordinator;

in response to said bus request signal, sending an asserted bus grant signal from said bus coordinator to said node to grant control of said bus to said node for a first tenure, said bus coordinator maintaining said grant signal in the asserted state as long as said bus request signal is asserted;

transmitting information signals from said node onto said bus in response to said asserted grant signal;

sending a deasserted bus request signal from said node to said bus coordinator prior to transmitting a last portion of said information signals;

in response to said deasserted bus request signal, maintaining, by said bus coordinator, said bus grant signal in the asserted state for at least one extra clock cycle after said deasserted bus request signal is detected by said bus coordinator;

during said extra clock cycle:
      transmitting said last portion of said information signals from said node onto said bus;
      sending a reasserted bus request signal from said node to said bus coordinator;

further in response to said deasserted bus request signal, initiating, by said bus coordinator, an arbitration procedure to determine whether control of said bus is to be granted again to said node; and in response to a determination that control of said bus is to be granted again to said node, maintaining said bus grant signal in the asserted state to grant control of said bus to said node for a second tenure, said grant signal experiencing no change in state between said first and second tenures.

4. The method of claim 3, further comprising the step of:

in response to a determination that control of said bus is not to be granted again to said node, deasserting, by said bus coordinator, said bus grant signal.

5. A bus system, comprising:

a bus;

a node coupled to said bus; and a bus coordinator coupled to said node for coordinating access to said bus by said node, said coordinator receiving an asserted bus request signal from said node and, in response, said coordinator sending an asserted bus grant signal to said node to grant control of said bus to said node for a first tenure, said coordinator maintaining said bus grant signal in the asserted state as long as said bus request signal is asserted, said coordinator further monitoring said bus request signal to detect any deassertion of said but request signal, and in response to a deassertion of said request signal, said bus coordinator maintaining said bus grant signal in the asserted state for at least one extra clock cycle after deassertion of said request signal is detected, said coordinator further, in response to a deassertion of said bus request signal, initiating an arbitration procedure to determine whether control of said bus is to be granted again to said node, and in response to a determination that control of said bus is to be granted again to said node, said bus coordinator maintaining said bus grant signal in the asserted state to grant control of said bus to said node for a second tenure, said grant signal experiencing no change in state between said first and second tenures.

6. The system of claim 5, wherein said coordinator, in response to a determination that control of said bus is not to be granted again to said node, deasserts said bus grant signal.

7. The system of claim 5, wherein said node, after receiving said asserted bus grant signal from said coordinator, transmits information signals onto said bus, said node deasserting said request signal before transmitting a last portion of said information signals and transmitting said last portion of said information signals during said extra clock cycle.

8. A bus access coordinator for controlling access to a bus by a node, comprising:

means for receiving an asserted bus request signal from the node;

means for sending, in response to said bus request signal, an asserted bus grant signal to the node to grant control of the bus to the node for a first tenure, said sending means maintaining said grant signal in the asserted state as long as said bus request signal is asserted;

means for monitoring said bus request signal to detect any deassertion of said bus request signal;

means for maintaining, in response to a deassertion of said bus request signal, said bus grant signal in the asserted state for at least one extra clock cycle after deassertion of said request signal is detected;

means for initiating, in response to a deassertion of said bus request signal, an arbitration procedure to determine whether control of said bus is to be granted again to said node; and means for maintaining, in response to a determination that control of said bus is to be granted again to said node, said bus grant signal in the asserted state to grant control of said bus to said node for a second tenure, said grant signal experiencing no change in state between said first and second tenures.

* * * * *